(12) United States Patent
Whiter (10) Patent No.: US 9,707,736 B2
(45) Date of Patent: Jul. 18, 2017

(54) COMPOSITE MATERIALS (75) Inventor: Mark Whiter, Saffron Walden (GB)

(73) Assignee: Hexcel Composites Limited, Duxford (GB)

( * ) Notice: Subject to any disclaimer, the term of this patent is extended or adjusted under 35 U.S.C. 154(b) by 243 days.

(21) Appl. No.: 13/809,300

(22) PCT Filed: Jul. 19, 2011

(86) PCT No.: PCT/EP2011/003608
§ 371 (c)(1),
(2), (4) Date: Jan. 9, 2013

(87) PCT Pub. No.: WO2012/010293
PCT Pub. Date: Jan. 26, 2012

(65) Prior Publication Data
US 2013/0115410 A1    May 9, 2013

(30) Foreign Application Priority Data

Jul. 20, 2010  (GB) .................................. 1012134.1
Jul. 20, 2010  (GB) .................................. 1012135.8

(51) Int. Cl.
*B32B 5/26*     (2006.01)
*B65H 16/00*    (2006.01)
(Continued)

(52) U.S. Cl.
CPC ................. *B32B 5/26* (2013.01); *B32B 3/10* (2013.01); *B32B 3/26* (2013.01); *B32B 5/02* (2013.01);
(Continued)

(58) Field of Classification Search
CPC . B32B 2250/20; B32B 2260/046; B32B 5/02; B32B 5/26; B32B 2305/076; B32B 2260/023; B32B 2262/101; B32B 2262/106; B32B 25/10; Y10T 428/23979; Y10T 442/10
(Continued)

(56) References Cited

U.S. PATENT DOCUMENTS 4,927,706 A * 5/1990 Born ........................ 428/304.4
7,261,930 B2 * 8/2007 Ellis ............................ 428/114
(Continued)

FOREIGN PATENT DOCUMENTS

DE    102004032833    *  2/2006
EP         1741742    *  1/2007
(Continued)

OTHER PUBLICATIONS

Beier et al., Mechanical performance of carbon fiber reinforced composites based on preforms stitched with innovative low melting temperature and matrix soluble thermoplastic yarns, Composites Part A, Applied Science and Manufacturing, Jan. 2008, 39(9) pp. 1572-1581.*

*Primary Examiner* — Camie Thompson
(74) *Attorney, Agent, or Firm* — W. Mark Bielawski; David J. Oldenkamp (57) ABSTRACT

A curable sheet-like composite material comprising curable resin and at least one layer of structural fibers and comprising an outer backing layer of substantially resin-free material which is gas permeable but is substantially non-permeable with respect to the curable resin at room temperature.

20 Claims, 1 Drawing Sheet (51) Int. Cl.
- B32B 17/02 (2006.01)
- B32B 17/06 (2006.01)
- B32B 3/10 (2006.01)
- B32B 3/26 (2006.01)
- B32B 5/02 (2006.01)
- B65G 59/00 (2006.01)
- B65H 18/28 (2006.01)
- B32B 5/08 (2006.01)

(52) U.S. Cl.
CPC ............. *B32B 5/08* (2013.01); *B32B 17/02* (2013.01); *B32B 17/067* (2013.01); *B65G 59/00* (2013.01); *B65H 16/00* (2013.01); *B65H 18/28* (2013.01); *B32B 2250/20* (2013.01); *B32B 2260/021* (2013.01); *B32B 2260/046* (2013.01); *B32B 2262/02* (2013.01); *B32B 2262/0269* (2013.01); *B32B 2262/10* (2013.01); *B32B 2262/101* (2013.01); *B32B 2262/106* (2013.01); *B32B 2262/14* (2013.01); *B32B 2307/542* (2013.01); *B32B 2307/546* (2013.01); *B32B 2307/72* (2013.01); *B32B 2307/724* (2013.01); *B32B 2307/732* (2013.01); *Y10T 428/23979* (2015.04); *Y10T 428/24802* (2015.01); *Y10T 428/249921* (2015.04); *Y10T 428/249953* (2015.04); *Y10T 428/249979* (2015.04); *Y10T 428/27* (2015.01)

(58) Field of Classification Search
USPC ......... 428/292.1–301.4, 299.1, 299.4, 297.4, 428/315.9, 95, 221, 195.1, 340; 442/389–390, 1, 14, 50, 57, 225, 235, 442/286, 271, 272, 278, 326
See application file for complete search history.

(56) References Cited

U.S. PATENT DOCUMENTS

| | | | |
|---|---|---|---|
| 2003/0207116 A1* | 11/2003 | Franken et al. | 428/411.1 |
| 2005/0079782 A1 | 4/2005 | Gastel | |
| 2005/0255766 A1* | 11/2005 | Kruger et al. | 442/21 |
| 2006/0252334 A1* | 11/2006 | LoFaro et al. | 442/400 |

FOREIGN PATENT DOCUMENTS

| | | | |
|---|---|---|---|
| EP | WO2008-007094 | * | 1/2008 |
| GB | 2124130 | | 2/1984 |
| JP | 50087170 | | 12/1973 |
| JP | 2006104394 | | 10/2004 |
| WO | 00/27632 | | 5/2000 |
| WO | 2007/038673 | | 4/2007 |
| WO | 2011/117643 | | 9/2011 |

* cited by examiner

COMPOSITE MATERIALS

TECHNICAL FIELD

The present invention relates to composite materials, particularly curable prepregs and semipregs.

BACKGROUND

Composite materials have well-documented advantages over traditional construction materials, particularly in providing excellent mechanical properties at very low material densities. As a result, the use of such materials is becoming increasingly widespread and their fields of application range from "industrial" and "sports and leisure" to high performance aerospace components.

"Prepregs", comprising a fibre arrangement impregnated with resin such as epoxy resin, are widely used in the generation of such composite materials. Typically a number of plies of such prepregs are "laid-up" as desired and the resulting laminate is cured, typically by exposure to elevated temperatures, to produce a cured composite laminate.

A particular type of prepreg is the so-called "semipreg", which involves the fibre arrangement being only partly impregnated with resin, leaving a portion of the fibre arrangement in a "dry" state. Semipregs also comprise moulding materials comprising one or more layers of a fibrous reinforcement material which are held in place on a resin layer by the inherent tack of the resin. In these semipregs, the fibrous reinforcement material is unimpregnated or "dry" or it is at least substantially unimpregnated or dry. An example of such a material is disclosed in WO 00/27632.

Semipregs can provide lower porosities in the final cured composite laminate, as the dry regions allow a pathway for entrapped air and volatiles to escape from the laminate.

A common semipreg arrangement is to have a layer of curable resin in contact with one or two adjacent layers of fibres which stay essentially dry with only very little resin migrating into the adjacent fibres. Such semipregs find particular use as part of large load-bearing structures e.g. spars for wind turbine blades.

However, some resin does inevitably migrate into the fibres over time, particularly during storage which compromises the volatile venting properties of the fibrous reinforcement during processing and curing of the prepreg or semipreg. The resin can also pass through to an outer face of the prepreg or semipreg, a phenomenon known as blocking. This is again undesirable as it prevents volatiles from escaping from laminate structures which contain multiple prepreg or semipreg layers.

Processing and curing of the composite material are achieved by increasing the temperature of the material through heating (generally above 40° C.). As the temperature during processing is increased, the resin material starts to cure and the material changes into a solid state.

The curing reaction is an exotherm reaction. To control the reaction, the energy input is typically staged into two or more stages to prevent a runaway exotherm reaction in the moulding which would result in poor mechanical properties of the moulded article. Typically in the first stage of processing, the temperature is increased over time to a desired first level and held constant for a time period (known as the dwell stage or dwell period). Following on from the first dwell period, the temperature is further increased to a second level and held constant over time (second dwell stage). The temperature increase and subsequent dwell may be further repeated depending on the properties of the moulding and the composite material.

Often, in addition to heating and temperature control equipment, the moulding is also pressurized to ensure adequate wetting out of the fibrous reinforcement material by the resin. The material may be pressurized in an autoclave or the material may be in a flexible envelope which is depressurized to increase the pressure on the moulding. This latter technique is commonly known as "vacuum bagging".

Prepregs and semipregs are typically produced as a roll of sheet material. When it is desired to produce a structure from the prepreg or semipreg the roll is unrolled, and the material laid down as desired. To allow this unrolling to occur even after prolonged storage which could result in migration of the resin into the dry fibrous reinforcement material, a solid non-porous backing sheet, e.g. polythene or paper, is generally applied to an outer face of the prepreg or semipreg.

Upon rolling the material into a roll the backing sheet prevents adjacent layers of prepreg or semipreg from adhering to each other due to any undesirable resin migration. As the roll is subsequently unrolled the backing sheet is then removed from the curable prepreg or semipreg, and is then discarded as waste.

Such solid backing sheets are therefore carefully prepared and formulated to provide a non-stick surface so they can detach from a resinous surface and prevent adhesion between adjacent layers of rolled prepreg or semipreg.

However, this use of the backing sheet is wasteful and adds to the cost of production, as it is discarded after use. Furthermore, there is a possibility that the backing sheet will not be successfully removed from the roll despite efforts to the contrary, particularly when it is applied in an automated process, as is increasingly common. When this happens then the entire stack of prepregs and/or semipregs is rejected.

Attempts have been made to produce semipregs which do not require the use of a backing sheet. This has involved increasing the viscosity of the curable resin layer so that it has less tendency to migrate through any adjacent fibre layer and cause blocking. Whilst this can be achieved, the increase in viscosity reduces the tack and drapability of the semipreg, and only prolongs the inevitable blocking, allowing for a limited storage time. In view of these disadvantages, semipregs without a backing sheet are not currently recommended.

Further improvement in this area would therefore be highly desirable.

The present invention aims to obviate and/or mitigate the above described problems and/or to provide advantages generally.

SUMMARY OF THE INVENTION

According to the invention there is provided a composite material, a roll, a stack and a method as defined in any one of the accompanying claims.

In a first aspect, the invention relates to a curable sheet-like composite material comprising curable resin and at least one layer of structural fibres and comprising an outer backing layer of substantially resin-free material which is gas permeable but is substantially non-permeable with respect to the curable resin at room temperature.

"Gas permeable" means that the material is permeable to air and other gases or volatiles such as the gases which may be released from the resin during processing and curing. The gas permeability facilitates the removal of air and volatiles during processing and curing which in turn results in a cured composite material moulding which has a reduced concentration of entrapped gases in its structure.

The backing layer acts as a barrier to prevent the resin from migrating to the outer surface prior to processing. This allows storage of the material on any surface (or even onto itself) prior to processing as the composite material can simply be removed since no resin contacts the surface. Some resin may penetrate the backing layer or barrier, but the backing layer is splittable or divisible to enable the removal of the composite material as we will discuss in more detail below.

The material of the invention can be rolled into itself without removal of the backing layer. Furthermore, as the backing layer is substantially non-permeable to the curable resin it prevents the migration of resin to adjacent rolled layers of material. Thus, the material can be unrolled with a very low peel force, keeping the remainder of the composite material intact.

Thus, the sheet-like composite material is preferably in the form of a roll. Therefore, the composite material is preferably sufficiently flexible so as to be able to form a roll with a diameter less than 20 cm, more preferably less than 10 cm. As such, the composite material is preferably not so thick that it cannot be easily rolled. Thus, typically the composite material has a thickness of from 0.5 to 5.0 mm, preferably from 1.0 to 4.0 mm.

It can therefore be seen that the backing layer of the invention is not removed, as it forms an integral part of the composite material and is therefore part of the composite material. This is highly innovative, as to introduce a foreign body into the composite material is believed to negatively impact the mechanical properties of the resulting cured composite material.

Thus, the composite material is typically free of any removable solid backing sheet.

By "removable" is meant that the sheet can be peeled from the composite material, leaving the remainder of the composite material intact.

The composite material is typically a prepreg or a semipreg. However, the invention is believed to be particularly applicable to semipregs.

A typical arrangement of semipreg includes a layer of curable resin in contact with one or two layers of structural fibres which are not impregnated with resin. In this arrangement the backing layer is preferably adjacent to one such structural fibre layer, however other arrangements are possible.

The composite material may comprise additional layers of material, however each must be taken to ensure the composite material remains flexible enough to form a roll.

The composite material of the present invention is particularly suitable for use in forming a structural component, e.g. a spar for wind turbine blades or an aerospace vehicle such as an aircraft. As such structures are generally fairly large, it is preferable that the composite material can form a roll having a length of greater than 10.0 cm, and at least 1.0 m of rolled material. Thus, the composite material has a surface area of at least 0.1 m$^2$, preferably at least 0.3 m$^2$.

It will be understood that the composite materials of the present invention only require one outer face to comprise a backing layer as described herein.

However, it has been found to be advantageous if the composite material comprises two backing layers of substantially resin-free material which is gas permeable but are substantially non-permeable with respect to the curable resin at room temperature.

When there are two backing layers, they may each be located on a different outer face of the composite material. Alternatively, they may both be present on the same outer face of the composite material.

Irrespective of which arrangement is adopted, once the composite material is rolled onto itself, the rolled material will involve the two layers of backing material adjacent to each other and separately adjacent structural fibre layers containing curable resin.

It has been found that, particularly in embodiments where there is only one backing layer, a low peel force can arise due to the ability of a backing layer to separate or split into two layered portions.

During storage some curable resin inevitably migrates into the backing layer, from one or both sides, to a limited degree. However, upon unrolling, the backing sheet is typically capable of separating or splitting into two layered portions. As the backing layer is substantially non-permeable to the curable resin any migration will be limited and so the separation or splitting into two portions can occur through the backing layer at a point which is resin-free.

Thus, in this embodiment, the resistance to unrolling is limited to the integrity strength of the backing layer or layers.

Thus, the composite material preferably comprises a backing layer having an integrity of less than 10 N according to the peel force test described below.

Thus, once unrolled, both outer faces of the composite material preferably each comprise a separated or split layer of a backing layer defined herein.

In embodiments where there are two backing layers, only one of the layers is required to separate or split into two portions with a low force.

In order to be suitably gas permeable, the backing layer or layers are open-structured. In a preferred embodiment the backing layer or layers are fibrous, preferably comprised of random fibres of material, intertwined together in the form of a fleece.

As such the backing layer or layers are typically of very low densities, with densities in the range of from 100 to 300 kg·m$^{-3}$ being desirable.

The backing layer or layers, although gas permeable, are substantially non-permeable to the curable resin. Migration of resin during storage is believed to be caused by capillary action through the pores in the material. Thus, it has been found that substantially non-resin permeable materials can be produced by arranging for a suitably small effective pore size.

Thus, the backing layer or layers preferably have an effective or mean pore diameter or pore size of from 10 to 100 micrometers.

Another measure of effective pore size is the average open pore area, and the backing layer or layers preferably have an average pore area of from 100 to 10000 $\mu m^2$, preferably from 300 to 6000 $\mu m^2$.

The effective pore size and degree of openness can be measured by the test method described below.

The effective pore size and pore area are measured by presenting a sample of the material to a microscope by mounting the sample to a blue plastic card to highlight the open areas when viewed on the computer monitor. The microscope is set at 175× magnification with the light output set to maximum. A computer image is recorded for a known sample area, typically a total area of 2951002 $\mu m^2$. The image is manipulated by means of adjusting sliders on a histogram to create a two colour image whereby one colour represents the veil fibres and the other represents the open space. The areas of individual open spaces are measured using image processing. This data is saved to a spreadsheet which can then be used to calculate the total pore area or open area occupied by open spaces (in order to calculate the % openness) along with the average size of the open areas or pore size.

The backing layer or layer may also be characterised by the degree of openness of the layer, i.e. the percentage of an average surface area of the sheet which is made up of open holes in the sheet. The backing layer or layers of the present invention typically have a degree of openness of from 10% to 70%, preferably from 15% to 60%.

As the backing layer or layers are cured into the composite material it is important that they are not too heavy. Thus a weight per unit area of from 10 to 100 grams per square meter is preferred, more preferably from 15 to 75 gsm.

Additionally, it is important that the backing layer or layers are not too thick and so preferably have a thickness of from 50 to 200 micrometers.

The material of the backing layer or layers can be selected from a wide range of materials, such as glass fibres or polymeric fibres such as phenoxy materials.

It has been found that glass fibre backing layers are easily separable or splittable or divisible into two layered portions and thus are highly preferred materials. The backing layer is divisible due to the nature of its structure which allows the material to be separated. The backing layer may be partially impregnated with resin which improves the separation of the backing layer into an impregnated part and an unimpregnated part, the impregnated part being retained on the structural fibre layer.

However it has also been found that the use of glass fibre backing layers can have a negative impact on the interlaminar shear strength of the eventual cured composite.

However, it has also been surprisingly found that phenoxy fibre backing layers can increase the interlaminar shear strength of the eventual cured composite material. This is particularly surprising as it is conventionally believed that introducing what is effectively a foreign body into the composite, has a negative effect on interlaminar shear strength, as is the case with glass fibres. Thus, phenoxy fibre backing layers are highly preferred.

It has been further observed that the use of both a glass fibre backing layer and a phenoxy fibre backing layer can result in neither an increase nor a decrease in interlaminar shear strength. This embodiment is therefore highly preferred as it has the advantage of the easy separability or splittability of the glass fibre without the associated drop in interlaminar shear strength.

In another aspect, the invention relates to a method of forming a roll of uncured composite material wherein a composite material as defined hereinbefore is rolled onto itself without the presence of a removable solid backing sheet.

Likewise, in another aspect, the invention relates to a method of unrolling a roll of uncured composite material as defined hereinbefore rolled onto itself without the presence of a removable solid sheet, whereby the unrolling is facilitated by the separation or splitting of a backing layer into two layered portions.

Once unrolled, the composite material is laid down, typically as part of a multiple layer arrangement to conform to the shape of a structural member or a mould surface. The composite material can then be processed and cured, by exposure to one or more elevated temperatures, and optionally elevated pressure, to produce a cured composite material.

According to another invention, there is provided a composite material, particularly a curable prepreg and semipreg having improved interlaminar shear strength.

According to this invention, there is provided a curable composite material comprising curable resin and at least one layer of structural fibres and comprising a layer of fibrous phenoxy material.

It has been found that composite materials which contain such a fibrous phenoxy material, once cured to form a cured composite material, exhibit a surprising improvement in interlaminar shear strength.

The composite material may be a prepreg or it may be a semipreg. The invention is equally suitable to both types of composite material.

A typical arrangement of semipreg includes a layer of curable resin in contact with one or two layers of structural fibres which are not impregnated with resin. When the composite material is a semipreg, the fibrous phenoxy material is typically substantially resin-free.

A typical arrangement of prepreg is to have a single layer of structural fibres being substantially impregnated with curable resin. However prepregs with more than one layer of structural fibres are possible. Such a prepreg may also have an essentially fibre-free resin layer which may be adjacent to the impregnated structural fibres. When the composite material is a prepreg, the fibrous phenoxy material is typically also substantially impregnated with curable resin.

The fibrous phenoxy material may be located at any convenient position in the composite material.

Irrespective of whether the composite material is a prepreg or a semipreg, the composite material according to the invention is intended to be laid up with other composite materials, which may be the same or different, to form a curable composite material stack.

Thus, in a second aspect, the invention relates to a curable stack of composite material, the stack comprising a plurality of layers of structural fibres and comprising at least one layer of fibrous phenoxy material.

If prepregs comprising an essentially fibre-free resin layer are part of the composite material stack, then the fibre-free layers form so-called interleaf layers within the stack.

Such a stack may comprise, for example, from 4 to 200 layers of structural fibres.

Typically the stack comprises a plurality of layers of fibrous phenoxy material. In a preferred embodiment the stack comprises at least half as many fibrous phenoxy layers as there are layers of structural fibres. It may even be desirable to comprise at least 75% as many fibrous phenoxy layers as there are layers of structural fibres, or even approximately the same number of fibrous phenoxy layers as structural fibre layers.

The composite material and composite material stacks of the present invention may include other functional elements known in the art, according to the requirements of the intended application.

The fibrous phenoxy material is preferably comprised of random fibres of material, intertwined together in the form of a fleece.

The fibrous phenoxy material may therefore have a low material density (in a non-resin impregnated form) of from 100 to 300 $kg \cdot m^{-3}$.

It has been found to be desirable if the phenoxy material has a fairly narrow effective pore size. Thus, the fibrous phenoxy material preferably has an effective or mean pore diameter of from 10 to 100 micrometers.

Another measure of effective pore size is the average open pore area, and the fibrous phenoxy material preferably has an average pore area of from 100 to 10000 µm², preferably from 300 to 6000 µm².

The fibrous phenoxy material may also be characterised by the degree of openness of the layer, i.e. the percentage of an average surface area of the sheet which is made up of open holes in the sheet. The fibrous phenoxy material of the present invention typically have a degree of openness of from 10% to 70%, preferably from 15% to 60%.

The effective pore size and degree of openness can be measured by the test method described below.

As the fibrous phenoxy material is part of the composite material it is desirable if it is light weight. Thus, a weight per unit area of from 10 to 100 grams per square meter is preferred, more preferably from 15 to 75 gsm.

Additionally, it is desirable that the fibrous phenoxy material is not too thick and so preferably has a thickness of from 50 to 200 micrometers.

The composite material, or stack, is intended to be laid down, e.g. to form the shape of a structural member. The composite material or stack is then cured, by exposure to elevated temperature, and optionally elevated pressure, to produce a cured composite material having improved interlaminar shear strength.

During the initial stages of the cure cycle, the temperature is gradually increased over time. During this warming stage curing does not yet occur but the viscosity of the curable resin drops significantly. This leads to an increased degree of resin impregnation as gas exits the composite material. Furthermore, the phenoxy material, being a thermoplastic, tends to melt during this stage, losing its fibrous nature.

Thus, in another aspect, the invention relates to a cured composite material obtainable by exposing a composite material, or stack, as disclosed herein, to an elevated temperature, and optionally an elevated pressure, at a temperature and for a duration sufficient to cause curing of the curable resin.

The fibres in the structural fibre layers may be uni-directional, fabric form or multi-axial. Preferably the fibres are uni-directional and their orientation will vary throughout the composite material, e.g. prepreg or semipreg, for example by arranging for the fibres in neighbouring layers to be orthogonal to each other in a so-called 0/90 arrangement, signifying the angles between neighbouring fibre layers. Other arrangements such as 0/+45/−45/90 are of course possible among many other arrangements.

The fibres may comprise cracked (i.e. stretch-broken), selectively discontinuous or continuous fibres.

The structural fibres may be made from a wide variety of materials such as glass, carbon, graphite, metallised polymers aramid and mixtures thereof. Glass fibres are preferred. The composite material typically comprises from 30 to 70 wt % structural fibres.

As discussed above, in addition to the backing layer, the composite materials of the present invention comprise a curable resin, i.e. a thermosetting resin. The curable resin may be present as a discrete layer or may be fully or partially impregnated into a layer of structural fibres. The composite material typically comprises from 15 to 50 wt % curable resin.

The curable resin may be selected from those conventionally known in the art, such as resins of phenol-formaldehyde, urea-formaldehyde, 1,3,5-triazine-2,4,6-triamine (melamine), bismaleimide, epoxy resins, vinyl ester resins, benzoxazine resins, polyesters, unsaturated polyesters, cyanate ester resins, or mixtures thereof.

Particularly preferred are epoxy resins, for example monofunctional, difunctional or trifunctional or tetrafunctional epoxy resins.

The epoxy resin may comprise monofunctional, difunctional, trifunctional and/or tetrafunctional epoxy resins.

Suitable difunctional epoxy resins, by way of example, include those based on; diglycidyl ether of Bisphenol F, Bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof.

Difunctional epoxy resins may be preferably selected from diglycidyl ether of Bisphenol F, diglycidyl ether of Bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl ethers, epoxidised olefins, brominated resins, triglycidyl aminophenyls, aromatic glycidyl amines, heterocyclic glycidyl imidines and amides, glycidyl ethers, fluorinated epoxy resins, or any combination thereof.

Suitable tetrafunctional epoxy resins include N,N,N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY721 from Huntsman Advanced Materials).

The thermosetting resin may also comprise one or more curing agent. Suitable curing agents include anhydrides, particularly poly carboxylic anhydrides; amines, particularly aromatic amines e.g. 1,3-diaminobenzene, 4,4'-diaminodiphenylmethane, and particularly the sulphones, e.g. 4,4'-diaminodiphenyl sulphone (4,4' DDS), and 3,3'-diaminodiphenyl sulphone (3,3' DDS), and the phenol-formaldehyde resins. Preferred curing agents are the amino sulphones, particularly 4,4' DDS and 3,3' DDS.

Further examples of the type and design of the resin and fibres can be found in WO 2008/056123.

The inventions will now be illustrated, by way of example, and with reference to the following figures, in which.

Figure 1:
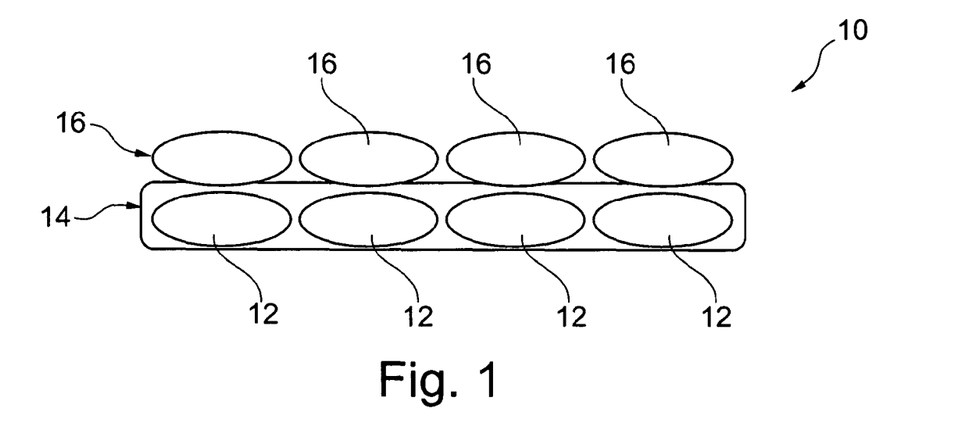
FIG. 1 is a schematic representation of a semipreg known in the art.

Turning to the figures, FIG. 1 shows a semipreg 10 known in the art comprising a layer of structural fibers 12 arranged in rows and impregnated in a curable epoxy resin 14. The semipreg 10 comprises a second layer of structural fibres 16, also arranged in rows but not impregnated with resin.

When such a semipreg 10 is rolled onto itself, resin 14 can migrate into an adjacent layer of fibres 16. Such migration causes the rolled semipreg layers to fuse together and cannot be unrolled without damaging the structural fibre layers. Thus, a solid backing sheet, e.g. polythene is added before such rolling occurs.

Figure 2:
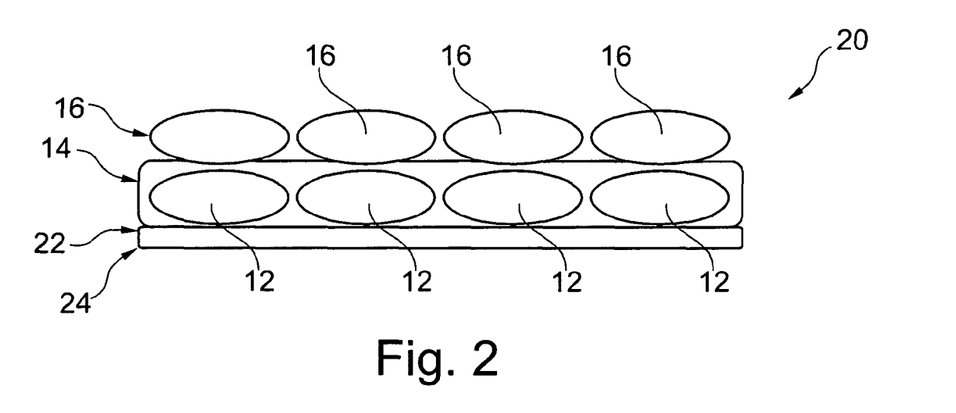
FIG. 2 is a schematic representation of a composite material according to the invention.

FIG. 2 shows a semipreg 20 according to the invention. The semipreg 20 has all the features of semipreg 10 and the same numbers have been employed where the features are the same.

However, the semipreg also comprises a first backing layer 22 and a second backing layer 24 both arranged on the same outer face of the semipreg.

The first backing layer 22 is a fibrous fleece comprising phenoxy fibres and having a weight per unit area of 25 gsm.

The second backing layer 24 is a fibrous glass fleece and having a weight per unit area of 30 gsm.

When such a semipreg 20 is rolled onto itself, resin 14 is unable to migrate through backing layers 22 and 24 because they are substantially non-permeable with respect to the curable resin 14. Thus adjacent layers of semipreg 20 do not adhere to each other and the roll can be unrolled with a low force and without damage to the structural fibres.

However, inevitably there will be some resin migration into fleeces 22, 24. In this case, as there are two backing layers, provided no resin migrates as far as the interface between the two fleeces 22, 24 then separation can occur easily.

However, even if some resin migrates to the interface between the fleeces 22, 24 a low peel force with no damage to the structural fibres results. This is because the integrity of the glass fleece 24 is low and can therefore separate or split into two layered portions upon unrolling.

EXAMPLES

Formulating Materials:
ST-3022 30 gsm non-woven glass fleece from Johns Manville GmbH, Wertheim, Germany.
S5030 50 gsm non-woven glass fleece from Johns Manville GmbH, Wertheim, Germany.
Grilon MS 25 gsm non-woven phenoxy fleece from EMS-Griltech, Domat/Ems, Switzerland.
Substrate Materials
HexFIT 1000: M9.7G/35%/B310+B310/2G semipreg material from Hexcel GmbH, Neumarkt, Austria.
HexFIT 2000: M9.6-LT/35%/BB630/2G semipreg material from Hexcel GmbH, Neumarkt, Austria.
M9.6-LT, M9.7G resin from Hexcel GmbH, Neumarkt, Austria.
Test Equipment
Instron 5569 test frame using Instron Series IX software, from Instron, High Wycombe, UK.
Backing Layer Characteristics and Fleece Characterisation
This was achieved by means of the Keyence VHX Digital Microscope. Samples of veil were presented to the microscope by mounting them to a blue plastic card in order to help highlight the open areas when viewed on the computer monitor. The microscope was set at 175× magnification with the light output set to maximum and the gain dial set to "3 o'clock". The computer image was saved and represented a total area of 2951002 $\mu m^2$.

The image was manipulated by means of adjusting sliders on a histogram in order to create a two colour image whereby one colour represents the veil fibres and the other represents the open space. The software is then used to measure the areas of all the individual open spaces. This data is saved to a spreadsheet which can then be used to calculate the total area occupied by open spaces (in order to calculate the % openness) along with the average size of the open areas.

| Fleece | % openness | Average open size $\mu m^2$ |
|---|---|---|
| ST-3022 30gsm | 54.25% | 3055 |
| S5030 50gsm | 22.92% | 993 |
| Grilon MS 25gsm | 37.92% | 3049 |

Test Method for Antiblocking Behaviour

Double sided pressure sensitive adhesive fabric was used to secure samples of semi-preg to a rigid aluminium substrate and a flexible aluminium foil substrate. These were pressed at ambient temperature at 11 kPa for 2 days using a pneumatic press. The sample panels were then cut into 25 mm strips for testing.

Testing was carried out using an Instron 5569 test frame using Instron Series IX software and a 2 kN load cell. The foil side was peeled off at 180° at a cross head speed of 300 mm/min, with the cross head moving 200 mm. This peeled back 100 mm of the sample. Peel strengths were recorded in units of N/25 mm. Qualitative assessment of fibre tow damage was also recorded.

Example 1—Peel Force HexFIT 1000

A semi-preg assembly of the HexFIT 1000 type comprise a resin rich prepreg material attached to one side of a dry fabric usually by means of the inherent tack of the prepreg resin. See FIG. 1.

This example comprises a HexFIT 1000 material constructed from a prepreg consisting of a 310 gsm layer of stitched unidirectional glass fabric impregnated with a 310 gsm layer of M9.6-LT or M9.7G resin (Hexcel proprietary formulated resin systems) and a further layer of dry glass UD fibrous reinforcement attached to either side of the prepreg. The unidirectional fibres in the prepreg run at +45° or +30° to the warp (i.e. 0°) direction and the other attached dry fibrous layer possesses the same unidirectional reinforcement fibres running at −45° or −30° to the warp direction. The reinforcement fibres are typically bundled into tows which are held in place by lightweight yarns woven into the tows. The yarns run in the warp (0° C. direction). On to the resin rich side of the semi-preg is assembly is placed a layer of fleece optionally followed by a second fleece. The fleeces are lightly pressed on to the semi-preg in order for them to stay in position. See FIG. 2.

Such an assembly then has the ability to be pressed together without the need for a polythene interleaf. This has been measured using an in-house test method of pressing together two plies of the above material such that the fleece side of the material is in contact with the dry fibre side of the adjacent layer.

The results are shown below in Table 1.

TABLE 1

| Fleece 1 | Fleece 2 | Peel force N | Fibre tow damage |
|---|---|---|---|
| None | None | 57 | Yes |
| Grilon 25gsm | None | 50 | Yes |
| Grilon 25gsm | Grilon 25gsm | 9 | No |
| S5030 | None | 16 | Minor |
| S5030 | S5030 | 7 | No |
| ST-3022 | None | 21 | Minor |
| ST-3022 | ST-3022 | 3 | No |
| Grilon 25gsm | S5030 | 6 | No |
| Grilon 25gsm | ST-3022 | 2 | No |

Example 2—Peel Force HexFIT 2000

Figure 3:
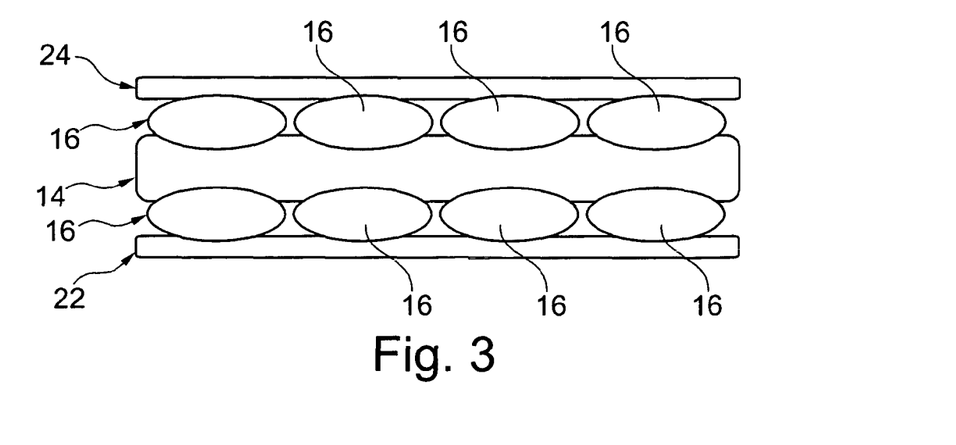
FIG. 3 is a schematic representation of another composite material according to the invention.

A standard semi-preg material constructed from a 340 gsm film layer of M9.6-LT resin (Hexcel proprietary formulated resin system) to which a layer of glass UD fibrous reinforcement is attached to either side of the film. One reinforcement layer typically possesses unidirectional fibres running at +45° or +30° to the warp (i.e. 0°) direction of the resin film and the other layer possesses the same unidirectional reinforcement fibres running at −45° or −30° to the warp direction. Again, the reinforcement fibres are typically bundled into tows which are held in place by lightweight yarns woven into the tows. The yarns run in the warp (0° C. direction). In examples according to the invention, to one side of the assembly a layer of fleece is attached and optionally also to the other side of the assembly. See FIG. 3.

Such an assembly when pressed together brings together the first fleece of one semipreg with the second fleece of the adjacent layer of semi-preg.

The results are shown below in Table 2.

TABLE 2

| Fleece 1 | Fleece 2 | Peel force (N) | Fibre tow damage |
|---|---|---|---|
| None | None | 38 | Yes |
| Grilon 25gsm | None | 41 | Yes |
| Grilon 25gsm | Grilon 25gsm | 19 | No |
| S5030 | None | 25 | No |
| S5030 | S5030 | 15 | No |
| ST-3022 | None | 22 | No |
| ST-3022 | ST-3022 | 15 | No |
| Grilon 25gsm | S5030 | 17 | No |
| Grilon 25gsm | ST-3022 | 15 | No |

Example 3 Interlaminar Shear Strength (ILSS)

Laminates consisting of 7 plies of HexFIT 2000 materials with backing layers according to the invention including a control with no backing layers, such that the fibres were orientated at +/−30° throughout the laminate, were prepared by curing in a vacuum bag assembly for 1 hour at 120° C. Test coupons of appropriate size of nominally 3×10×25 mm were then cut so that the fibre direction remained at +/−30° to the length of the test coupon. The coupons were then subjected to ILSS testing according to BS EN 2563.

ILSS results can be summarized in the table 3:

TABLE 3

| Material | Antiblocking layers | ILSS MPa |
|---|---|---|
| M9.6-LT/35%/BB630/2G | None (control) | 45 |
| M9.6-LT/35%/BB630/2G | 1 layer of ST-3022 fleece | 32 |
| M9.6-LT/35%/BB630/2G | 1 layer of ST-3022 fleece and 1 layer of Grilon MS fleece | 45 |
| M9.6-LT/35%/BB630/2G | 2 layers for Grilon MS fleece | 54 |

Therefore, whereas the use of ST-3022 alone reduces the ILSS performance, a combination of ST-3022 and Grilon MS results in a comparable ILSS performance to the control laminate and the use of Grilon MS fleece alone results in improved ILSS performance.

Example 4—Interlaminar Shear Strength

A standard semi-preg material constructed from a 340 gsm film layer of M9.6-LT resin (Hexcel proprietary formulated resin system) to which a layer of glass UD fibrous reinforcement is attached to either side of the film. One reinforcement layer typically possesses unidirectional fibres running at +45° or +30° to the warp (i.e. 0°) direction of the resin film and the other layer possesses the same unidirectional reinforcement fibres running at −45° or −30° to the warp direction. Again, the reinforcement fibres are typically bundled into tows which are held in place by lightweight yarns woven into the tows. The yarns run in the warp (0° direction.) To one side of the assembly a layer of a fibrous phenoxy layer in the form of Grilon MS fleece is attached and to the other side of the assembly a layer of ST-3022 is attached. The ST-3022 fleece can be substituted with another layer of Grilon MS fleece.

Laminates consisting of 7 plies of HexFIT 2000 materials with antiblocking layers including a control with no antiblocking layers such that the fibres were orientated at +/−30° throughout the laminate, were prepared by curing in a vacuum bag assembly for 1 hour at 120° C. Test coupons of appropriate size of nominally 3×10×25 mm were then cut so that the fibre direction remained at +/−30° to the length of the test coupon. The coupons were then subjected to ILSS testing according to BS EN 2563.

ILSS results can be summarized in the following table:

| Material | Antiblocking layers | ILSS MPa |
|---|---|---|
| M9.6-LT/35%/BB630/2G | None (control) | 45 |
| M9.6-LT/35%/BB630/2G | 1 layer of ST-3022 fleece | 32 |
| M9.6-LT/35%/BB630/2G | 1 layer of ST-3022 fleece and 1 layer of Grilon MS fleece | 45 |
| M9.6-LT/35%/BB630/2G | 2 layers for Grilon MS fleece | 54 |

Therefore Grilon MS results in improved ILSS performance.

Various additional embodiments of the inventions will now be described below.

In embodiment 1 there is provided a curable sheet-like composite material comprising curable resin and at least one layer of structural fibres and comprising an outer backing layer of substantially resin-free material which is gas permeable but is substantially non-permeable with respect to the curable resin at room temperature.

In embodiment 2 the composite material of embodiment 1 is in the form of a roll.

In embodiment 3 the composite material of embodiments 1 or 2, is sufficiently flexible so as to be able to form a roll with a diameter less than 20 cm, preferably less than 10 cm.

In embodiment 4 the composite material of any one of the preceding embodiments has a thickness of from 0.5 to 5.0 mm, preferably from 1.0 to 4.0 mm.

In embodiment 5 the composite material of any one of the preceding embodiments is free of any removable solid backing sheet.

In embodiment 6 the composite material according to any one of the preceding embodiments is a prepreg or a semipreg, preferably a semipreg.

In embodiment 7 the composite material according to embodiment 6 is a semipreg and includes a layer of curable resin in contact with one or two layers of structural fibres which are not impregnated with resin.

In embodiment 8 the composite material according to embodiment 7, has a curable resin adjacent to one such structural fibre layer.

In embodiment 9 the composite material according to any of the preceding embodiments is suitable for use in forming a structural component.

In embodiment 10, the composite material according to any of the preceding embodiments can form a roll forming a cylinder having a length of greater than 10.0 cm, and at least 1.0 m of rolled material.

In embodiment 11 the composite material according to any of the preceding embodiments comprises two backing layers of substantially resin-free material which are gas permeable but are substantially non-permeable with respect to the curable resin at room temperature.

In embodiment 12, the backing layer is separable or splittable into two layered portions.

In embodiment 13 the composite material is obtainable by the process of rolling a composite material according to embodiment 12 onto itself and subsequently unrolling the rolled material to produce a composite material with both outer faces each comprising a separated or split layer of the backing layer.

In embodiment 14, the composite material of any one of the preceding embodiments wherein the backing layer or layers are fibrous, preferably comprised of random fibres of material, intertwined together in the form of a fleece.

In embodiment 15, the composite material of any of the preceding embodiments, wherein the backing layer comprises a glass fibre fleece, a phenoxy fibre fleece or both are present.

In embodiment 16 the backing layer or layers of any of the preceding embodiments have a density in the range of from 100 to 300 kg·m$^{-3}$.

In embodiment 17 the composite material according to any one of the preceding embodiments comprises a backing layer or layers having an effective pore size of from 10 to 100 micrometers.

In embodiment 18 the composite material according to any one of the preceding embodiments comprises a backing layer or layers having a weight per unit area of from 10 to 100 grams per square meter.

In embodiment 19 the composite material according to any one of the preceding embodiments comprises a backing layer or layers having a degree of openness of from 10% to 70%, preferably from 15% to 60%.

In embodiment 20, the composite material according to any one of the preceding embodiments comprises a backing layer or layers having a thickness of from 50 to 200 micrometers.

In embodiment 21 there is provided a method of forming a roll of uncured composite material wherein a composite material according to any one of embodiments 1 to 20 is rolled onto itself without the presence of a removable solid backing sheet.

In embodiment 22 there is provided a method of unrolling a roll of uncured composite material according to any one of embodiments 1 to 20 rolled onto itself without the presence of a removable solid sheet, whereby the unrolling is facilitated by the separation or splitting of a backing layer into two layered portions.

According to another embodiment 23 of the invention, there is provided a curable composite material comprising curable resin and at least one layer of structural fibres and comprising a layer of fibrous phenoxy material.

In embodiment 24, the curable composite of embodiment 23 is a prepreg or a semipreg.

In embodiment 25, the curable composite of embodiment 24 is a semipreg and includes a layer of curable resin in contact with one or two layers of structural fibres which are not impregnated with resin, and wherein the fibrous phenoxy material is substantially resin-free.

In embodiment 26, the curable composite of embodiment 24 is a prepreg and wherein the fibrous phenoxy material is substantially impregnated with curable resin.

In embodiment 27, there is provided a curable stack of composite material, the stack comprising a plurality of layers of structural fibres and comprising at least one layer of fibrous phenoxy material.

In embodiment 28, the curable stack according to embodiment 27, wherein prepregs comprising an essentially fibre-free resin layer are part of the composite material stack, and the fibre-free layers form interleaf layers within the stack.

In embodiments 27 or 28, the stack comprises at least half as many fibrous phenoxy layers as there are layers of structural fibres, preferably comprising at least 75% as many fibrous phenoxy layers as there are layers of structural fibres, more preferably comprising approximately the same number of fibrous phenoxy layers as structural fibre layers.

In embodiment 30, in the curable stack according to any one of the preceding embodiments, the fibrous phenoxy material is comprised of random fibres of material, intertwined together in the form of a fleece.

In embodiment 31, in the curable composite or curable stack according to any one of the preceding embodiments, the fibrous phenoxy material has a material density (in a non-resin impregnated form) of from 100 to 300 kg·m$^{-3}$.

In embodiment 32, in the curable composite or curable stack according to any one of the preceding embodiments, the phenoxy material has an effective pore size of from 10 to 100 micrometers.

In embodiment 33, in the curable composite or curable stack according to any one of the preceding embodiments, the phenoxy material has a degree of openness of from 10% to 70%, preferably from 15% to 60%.

In embodiment 34, in the curable composite or curable stack according to any one of the preceding embodiments, the fibrous phenoxy material (in a non-resin impregnated form) has a weight per unit area of from 10 to 100 grams per square meter.

In embodiment 35, in the curable composite or curable stack according to any one of the preceding embodiments, the fibrous phenoxy material has a thickness of from 50 to 200 micrometers.

In embodiment 36, there is provided a cured composite material obtainable by exposing a composite material or stack according to any one of the preceding embodiments to an elevated temperature, and optionally an elevated pressure, at a temperature and for a duration sufficient to cause curing of the curable resin.

In embodiment 37, the cured composite according to embodiment 36 is in the form of a structural component.

The invention claimed is:

1. A semipreg having a first surface and a second surface which define the thickness of said semipreg, said semipreg being of sufficient thickness and flexibility to be formable into a roll of semipreg where said first surface and second surface are in contact with each other and wherein said roll of semipreg can be unrolled, said semipreg comprising:
   a resin rich structural layer comprising a layer of prepreg that comprises structural fibers and prepreg resin, said resin rich structural layer having a first side that comprises said prepreg resin and a second side that also comprises said prepreg resin;
   a resin free structural layer consisting of dry structural fibers, said resin free structural layer having an inside surface that is in contact with said prepreg resin located at the first side of said resin rich structural layer, said resin free structural layer having an outside surface that forms the first surface of said semipreg;

a layer of polymeric fleece that consists of non-woven polymeric fibers, said layer of polymeric fleece having a first side and a second side wherein the first side of said layer of polymeric fleece is in contact with said prepreg resin located at the second side of said resin rich structural layer and wherein the second side of said layer of polymeric fleece does not form the second surface of said semipreg; and a layer of glass fleece that consists of non-woven glass fibers, said layer of glass fleece having an inside surface that is in contact with the second side of said polymeric fleece and an outside surface wherein the outside surface of said layer of glass fleece forms the second surface of said semipreg and wherein said layer of glass fleece is separable during unrolling of said roll of semipreg such that a portion of said layer of glass fleece becomes attached to the first surface of said semipreg.

2. A semipreg according to claim 1 wherein said structural fibers in said resin rich structural layer are unidirectional fibers.

3. A semipreg according to claim 1 wherein said polymeric fibers in said polymeric fleece comprise a phenoxy material.

4. A semipreg according to claim 1 wherein the weight per unit area of said layer of polymeric fleece is from 10 to 100 grams per square meter and wherein the weight per unit area of said layer of glass fleece is from 10 to 100 grams per square meter.

5. A semipreg according to claim 1 wherein the thickness of said layer of polymeric fleece is from 50 to 200 micrometers and wherein the thickness of said layer of glass fleece is from 50 to 200 micrometers.

6. A semipreg according to claim 5 wherein the thickness of said semipreg is from 0.5 mm to 5.0 mm.

7. A semipreg according to claim 6 wherein the weight per unit area of said layer of polymeric fleece is from 15 to 75 grams per square meter and wherein the weight per unit area of said layer of glass fleece is from 15 to 75 grams per square meter.

8. A semipreg according to claim 1 wherein the mean pore size of said layer of polymeric fleece is from 10 to 100 micrometers and wherein the mean pore size of said layer of glass fleece is from 10 to 100 micrometers.

9. A roll of semipreg comprising semipreg according to claim 1 which has been formed into a roll in which the first surface of said semipreg is in contact with the second surface of said semipreg and wherein said prepreg resin has migrated into said resin free structural layer to form a partially impregnated structural layer.

10. A roll of semipreg according to claim 9 wherein said prepreg resin has migrated into said layer of polymeric fleece to form a partially impregnated layer of polymeric fleece.

11. A roll of semipreg according to claim 9 wherein the weight per unit area of said layer of polymeric fleece is from 10 to 100 grams per square meter and wherein the weight per unit area of said layer of glass fleece is from 10 to 100 grams per square meter.

12. A roll of semipreg according to claim 9 wherein the thickness of said semipreg is from 0.5 mm to 5.0 mm.

13. A roll of semipreg according to claim 12 wherein thickness of said layer of polymeric fleece is from 50 to 200 micrometers and wherein the thickness of said layer of glass fleece is from 50 to 200 micrometers.

14. A roll of semipreg according to claim 13 wherein the weight per unit area of said layer of polymeric fleece is from 15 to 75 grams per square meter and wherein the weight per unit area of said layer of glass fleece is from 15 to 75 grams per square meter.

15. A roll of semipreg according to claim 14 wherein the weight per unit area of said layer of glass fleece is from 30 to 50 grams per square meter.

16. A roll of semipreg according to claim 15 wherein said polymeric fibers in said polymeric fleece comprise a phenoxy material.

17. A semipreg according to claim 1 wherein the thickness of said semipreg is from 0.5 mm to 5.0 mm.

18. A semipreg according to claim 1 wherein the structural fibers in said resin rich structural layer are unidirectional fibers.

19. A semipreg according to claim 18 wherein said unidirectional fibers are glass fibers.

20. A semipreg according to claim 1 wherein the dry structural fibers in said resin free structural layer are unidirectional fibers.

* * * * *